Sept. 25, 1962     A. H. SMITH     3,055,039

CLEANING APPARATUS

Filed Feb. 2, 1959     4 Sheets-Sheet 1

INVENTOR.
Aaron H. Smith
BY
Roberts, Cushman & Grover
ATT'YS

Sept. 25, 1962   A. H. SMITH   3,055,039
CLEANING APPARATUS
Filed Feb. 2, 1959   4 Sheets-Sheet 2
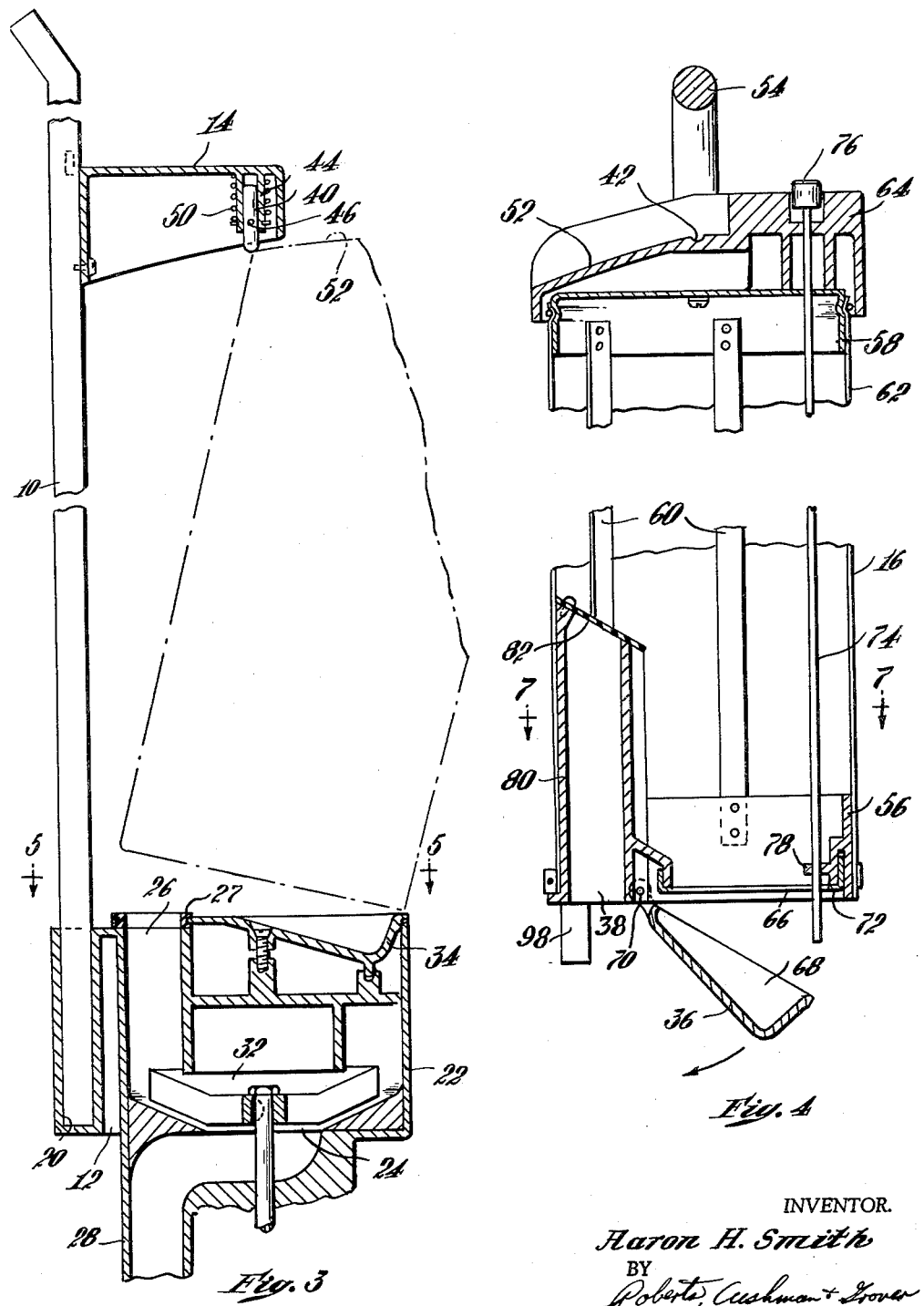

INVENTOR.
Aaron H. Smith
BY
Roberts, Cushman & Grover
ATT'YS

Sept. 25, 1962 — A. H. SMITH — 3,055,039
CLEANING APPARATUS
Filed Feb. 2, 1959 — 4 Sheets-Sheet 4

INVENTOR.
Aaron H. Smith
BY
Roberts, Cushman + Grover
ATT'YS

United States Patent Office 3,055,039
Patented Sept. 25, 1962

3,055,039
CLEANING APPARATUS
Aaron H. Smith, Ipswich, Mass., assignor to Signal Manufacturing Co., Lynn, Mass., a corporation of Massachusetts
Filed Feb. 2, 1959, Ser. No. 790,523
7 Claims. (Cl. 15—353)

This invention relates to apparatus for cleaning floors and floor coverings and has for its principal objects to provide an apparatus which can be used for picking up and collecting dust and/or liquid from the floor or floor covering; to provide an apparatus which may be converted quickly and easily from picking up dust to picking up liquid and vice versa; to provide an apparatus in which separate tanks are employed to receive the dust and liquid so that they are not mixed as they are in certain dual purpose machines; to provide an apparatus in which there is improved means for detachably mounting the tanks; to provide means for carrying the tanks and for setting them upright when not mounted on the frame; to provide means for emptying the tanks when necessary and to provide an apparatus which is efficient, durable and attractive in appearance.

As herein illustrated, the apparatus comprises a rigid frame mounting spaced supports between which may removably be disposed tanks for receiving solids or liquids. One of the supports, supports an end of an intake tube and a locating means interengageable with means at that end of the tank for bringing the intake port into registration with a port in the end of the tank. A spring pressed pin is mounted on the other support for engagement with a depression in the tank at that end and the latter has a cam on its end, operable to guide the pin into the depression and to compress the spring so that the tank is forced endwise in a direction to establish a seal between the end of the intake pipe and the port. Each tank contains a standpipe which extends thereinto, but terminates short of the top, and means for permitting flow through the standpipe into the tank but preventing flow in the opposite direction. In the tank for receiving dust the end of the standpipe is closed by a flap valve. In the tank for receiving liquid the standpipe is partially closed by a bell which permits liquid freely to enter the tank but prevents its escape. A handle is fixed to each tank and affords means for engaging and disengaging the tank from the spring pressed pin on the bracket and for transporting the tank when it is removed for emptying. There are feet at the opposite end of the tank upon which the tank may be set upright when not in use. A closure is hinged to the bottom of the dust tank so as to cover a discharge opening therein and there is a rod mounted in the tank operable from the opposite end to swing the closure to an open position. The end of the liquid tank is removable as is also the bell to permit emptying the liquid from the tank.

The invention will now be described in greater detail with reference to the accompanying drawings wherein:

FIG. 3 is a side elevation to somewhat larger scale with the tank removed and with the brackets in section;

FIG. 4 is a longitudinal section of the dust tank removed from the frame;

Figures 11, 12:
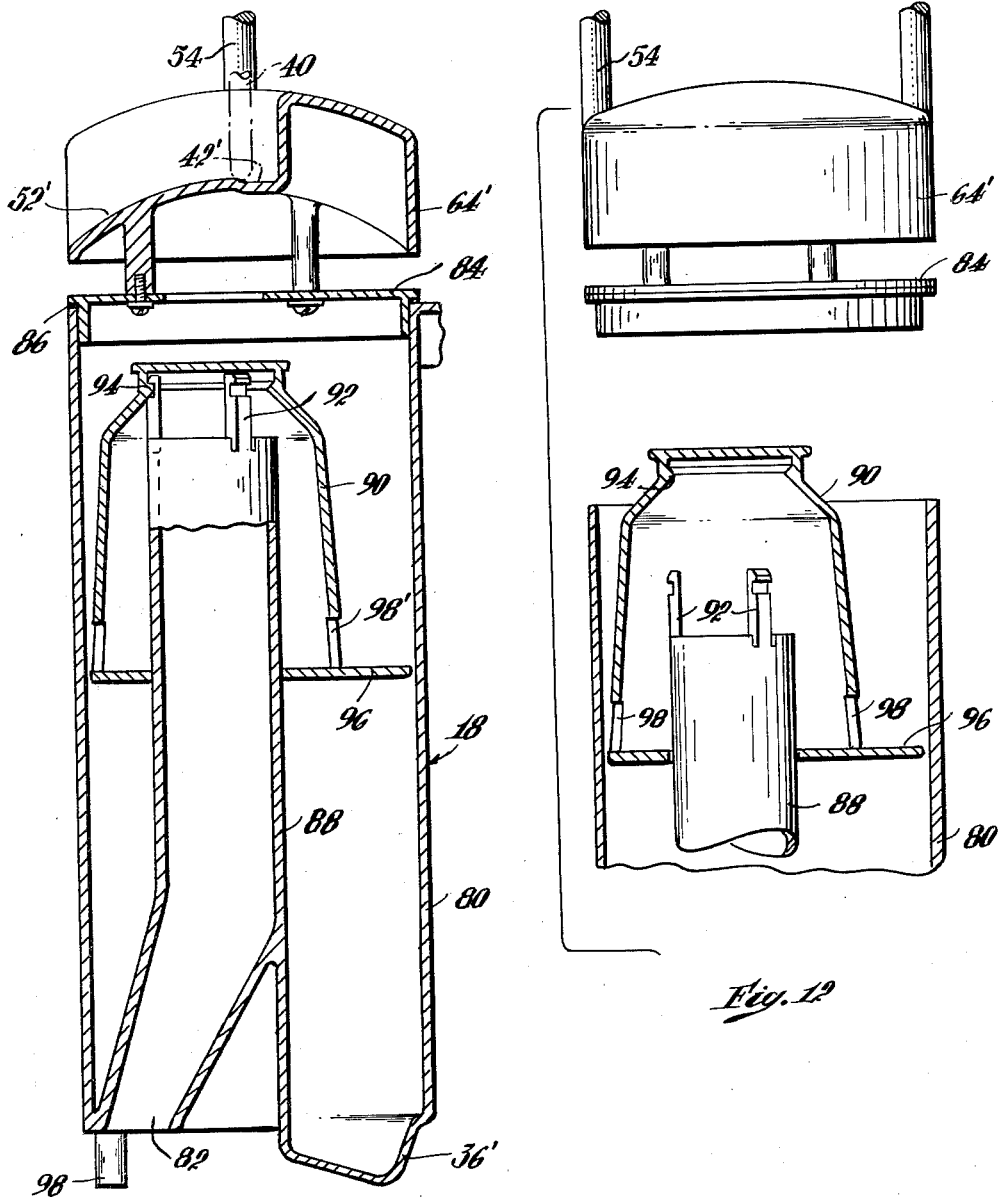
FIG. 11 is a longitudinal section of the liquid tank.
FIG. 12 is an elevation of the upper end of the liquid tank shown in FIG. 11, removed from the tank and showing the deflector bell partially withdrawn from the tank.

Referring to the drawings, the cleaning apparatus is designed especially to serve both for the purpose of collecting dust and other solid matter from floors and/or floor coverings and for the purpose of picking up wash water or other cleaning fluids from such surfaces and comprises in general (FIG. 2), a rigid frame made up of an elongate rigid tube 10 having a handle at one end (not shown), on which there are mounted in spaced relation lengthwise a pair of supporting members or brackets 12 and 14, between which may removably be placed a tank, such as shown at 16 (FIG. 4) for collecting dust, or a tank 18, such as shown in FIG. 11, for collecting liquid.

Figure 1:
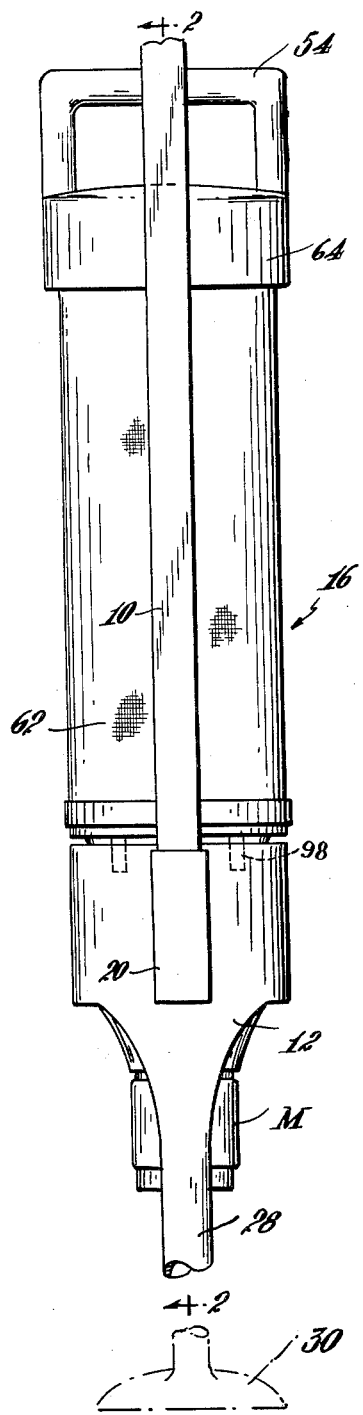
FIG. 1 is an elevation of the apparatus viewed from the back side.

The bracket 12 contains a socket 20 for receiving the lower end of the tube 10 to which it may be fixed in suitable manner. The bracket also supports a fan housing 22 which has an intake port 24 and a discharge port 26. A tubular conduit 28 extends from the intake port 24, downwardly from the housing 22 in a direction parallelling the axis of the tube 10, and has fastened to its lower end an appropriate pick-up nozzle 30 (FIG. 1). A fan 32 is mounted in the housing and is driven by a motor M, fastened to the underside of the support. As thus constructed, when the fan is rotating an intake draft is created in the direction of the arrows (FIG. 2) which sucks up material, whether solid or liquid, from the floor through the conduit 28 and discharges it through the port 26.

At the upper side of the housing 22, there is fastened a recessed seating plate 34 for receiving the lower end of the tank 16, the latter being provided at its lower end with a protrusion 36 of corresponding shape, adapted to nest in the seating plate 34. The nesting relation of the lower end of the tank with the seating plate has the two-fold purpose of preventing accidental displacement of the tank during use and of insuring registration of the intake port of the tank with the discharge port on the housing.

The tank 16 is removably secured in place by engagement of a spring pressed latch pin 40 (FIGS. 2 and 3), mounted on the upper support 14 with a depression 42 (FIGS. 2 and 4) at the upper end of the tank. The latch pin 40, as shown in FIG. 3, is slidable vertically in a sleeve 44 integral with the bracket, its movement being limited by a pin 46 engaged within a slot 48 in the sleeve. A coiled spring 50 is disposed about the sleeve behind the pin 46 for yieldingly forcing the latch pin 40 downwardly for engagement with the recess 52. The top of the tank, as shown in FIG. 4, has an inclined cam surface 42 which operates on the latch pin 40 when the lower end of the tank has been engaged in the seating plate 34 and tilted inwardly, as seen in dot and dash line 3, to force it upwardly against the opposition of the spring 44 until the recess 42 at the upper end of the tank comes into registration with the latch pin, thereby locking the tank in place. An elastic gasket 27 is disposed about the port 26 and this, together with the endwise thrust of the spring pressed pin on the tank, insures an air and liquid-tight seal between the ports 26 and 38.

A handle 54 (FIG. 4) is fastened to the tank so as to straddle the bracket 14 (FIG. 2) as the tank is moved into position and provides convenient means for disengaging the tank from the bracket and for carrying the tank about when it has been removed from the brackets and for convenience in emptying the content of the tank.

Figure 2:
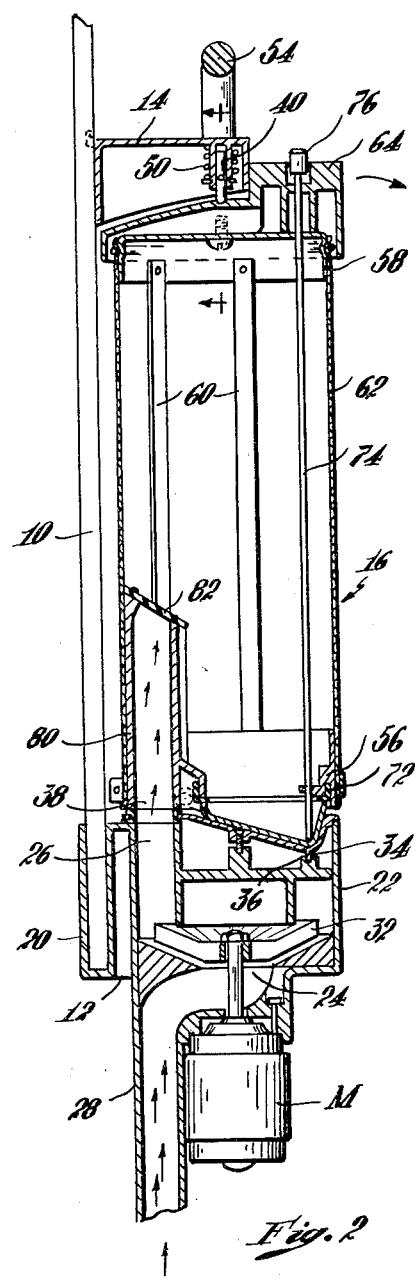
FIG. 2 is a section taken on the line 2—2 of FIG. 1.
Figure 6:
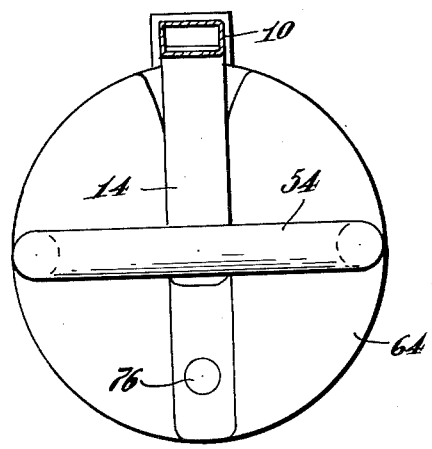
FIG. 6 is a top view of the tank shown in FIG. 4.
Figure 5:
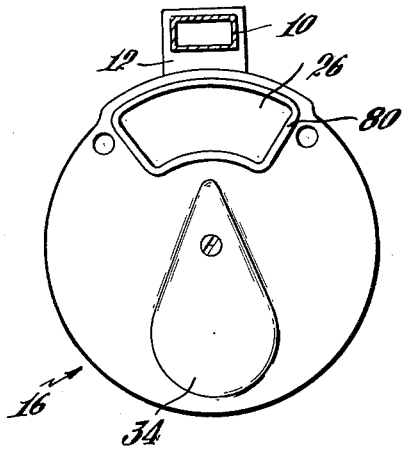
FIG. 5 is an elevation of the lower supporting bracket taken on the line 5—5 of FIG. 3.
Figure 7:
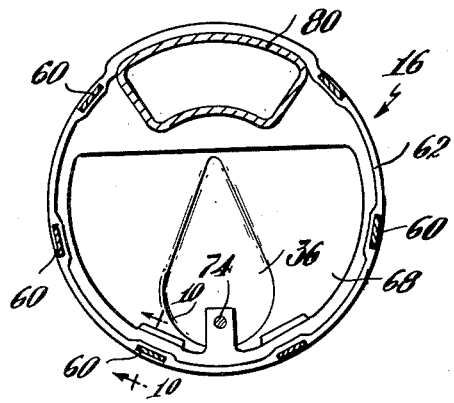
FIG. 7 is a diametrical section taken on the line 7—7 of FIG. 4.
Figure 8:
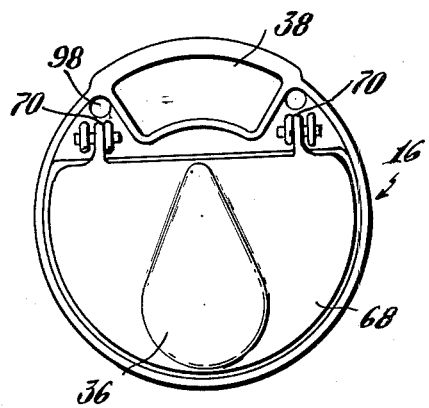
FIG. 8 is a bottom view of the tank.
Figure 9:
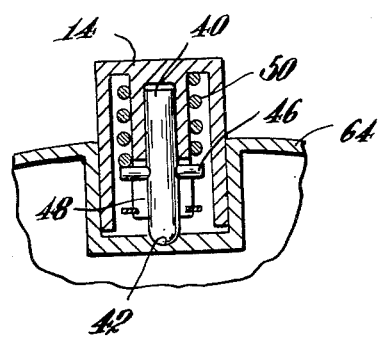
FIG. 9 is an enlarged section of the latch pin.
Figure 10:
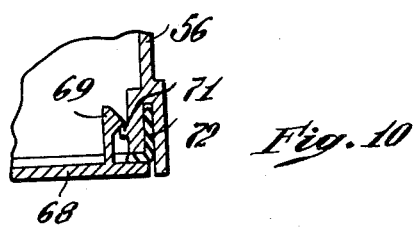
FIG. 10 is a fragmentary section of the closure latch for the dust tank.

The tank 16, as shown in FIGS. 4 and 8 inclusive, which has for its specific purpose to collect dust and solid matter, is generally cylindrical and is comprised of rigid end members 56 and 58 (FIG. 4) held in spaced relation by a plurality of longitudinally extending, rigid rods 60 spaced uniformly about the ends and fastened thereto in suitable manner to form a cage-like structure. A fabric envelope 62 is disposed about the cage with its ends secured to the end members 56 and 58 so as to form a hollow tank, the walls of which are impervious to dust but which permits air to pass through. The upper end member 58 has fastened to it a cap 64 which, as previously pointed out, contains the recess 42 and the cam surface 52. The handle 54 is fastened to the cap 64. The bottom end member 56, as shown in FIGS. 4 and 8, has an opening 66 and a closure 68 connected thereto by hinges 70 for covering the opening. The closure 68 conveniently constitutes the protruding portion 36 at the lower end of the tank which engages the seating plate 34. A gasket 72 is placed about the opening so as to provide a suitable seal between the closure 68 and the opening when the latter is closed. The closure 68 is held closed by a latch 69 on the closure and engaged with a nub 71 on the end member 56 (FIG. 10). To open the closure a rod 74 (FIGS. 2 and 4) is mounted to extend through the tank, from top to bottom. The upper end projects through the cap and has on it a push button 76 and the lower end extends through a flange 78 integral with the end member and bears upon the bottom of the closure 68 at the inside, as shown in FIG. 2, when the latter is closed. By pushing downwardly on the knob 76 the closure latch 69 may be disengaged from the nub 71 to permit the closure to open for emptying the tank.

The end member 56 also has in it the port 38 (FIG. 4) and from this port there extends upwardly into the tank a standpipe 80, the latter being an integral part of the end member. The upper end of the standpipe terminates short of the upper end of the tank and has fastened to it a closure 82 which is in the form of a flexible flap such as piece of rubber which normally closes the upper end of the standpipe, but which may be forced upwardly by air pressure to permit dust and the like to be forced from the upper end of the standpipe beneath the flap into the tank. When there is no pressure holding the flap open it closes the end thus preventing escape of the content from the tank.

The tank 18 (FIGS. 11 and 12) for receiving liquid which as pointed out heretofore, can be substituted for the tank 16 is, like the tank 16, provided with a protrusion 36' at its lower end for engagement with the seating plate 34 and at its upper end with a cap 64' containing a recess 42' for receiving the lower end of the latch pin 40 and a cam surface 52' for guiding the pin into position as the tank is pushed into position. The tank 18 is, however, in the form of a rigid cylinder 80, closed at its lower end except for a port 82 which is adapted to register with the port 26 on the bracket 12. The upper end of the tank is closed by a removable cover 84 which fits into it with a suitable gasket 86 disposed between its rim and the end of the tank and has fastened to it the cap 64. A standpipe 88 extends upwardly from the port 82 at the bottom of the tank toward the top, terminating short thereof. The upper end of the standpipe 88 is partially closed by a deflector 90 of bell-shape which is detachably mounted on the end of the standpipe, for example, by a plurality of yieldable fingers 92 (FIG. 12), extending from the end of the standpipe for engagement with a rib 94 on the inside of the deflector. The lower part of the deflector extends downwardly about the standpipe, providing an annular space about the standpipe, and has secured to its lower edge an end plate 96 which extends substantially diametrically of the tank about the standpipe. One or more openings 98 are provided in the lower portion of the deflector, adjacent the end plate. As thus constructed, fluid drawn upwardly through the standpipe is diverted by contact with the upper end of the bell so as to flow downwardly through the annular space and through the openings 98 above the end plate 96. There is sufficient clearance space between the edge of the end plate 96 and the inside of the tank to permit the liquid to drain downwardly into the bottom of the tank, however, the end plate 96 serves to prevent liquid at the bottom of the tank from flowing rapidly toward the upper end of the tank if laid on one side. To permit emptying the tank the cap 84 may be removed, as shown in FIG. 12, and the deflector 90 disengaged from the end of the standpipe and withdrawn from the open upper end of the tank.

Since one of the tanks will not be in use when the other is in use it is desirable to support it in an upright position. Accordingly, each tank is provided with legs at its bottom end. One of the legs is constituted by the protrustion 36 and the other two legs by pins 98 fastened to the bottom for this purpose.

It should be understood that the present disclosure is for the pupose of illustration only and that this invention includes all modifications and equivalents which fall within the scope of the appended claims.

I claim:

1. In a vacuum collector, a rigid frame mounting a pair of spaced brackets for removably receiving between them a tank, vacuum actuated pick-up means supported by one of the brackets including a discharge port, one of said brackets also supporting a depressed seating plate, a tank having a protrusion at one end adapted to mate with the depressed seating plate, an inlet port at that end for registration with the discharge port, and a depression at the opposite end, a spring pressed latch pin carried by the other bracket for engagement with said depression at the upper end of the tank, a cam surface at that end of the tank inclined toward the depression for guiding the latch pin into the depression while simultaneously compressing the spring, and a handle fixed to the tank by means of which the tank may be pulled in a direction to disengage the latch pin from the depression, said handle serving to carry the tank when the latter is removed from the frame, and means including said protrusion for standing the tank upright when removed from the frame.

2. In a vacuum collector, a rigid frame, pick-up means mounted on the frame, said pick-up means having an intake and discharge side, spaced brackets on the frame between which a tank may releasably be disposed with its lower end in communication with the discharge side of the pick-up means, a tank, locating means at the lower end of the tank, and means of the bracket at that end interengageable therewith to align the lower end of the tank with the discharge side of the pick-up means, means on the opposite bracket for engagement with the opposite end of the tank releasably to hold the tank between the brackets, and a pair of spaced legs at the lower end of the tank, said locating means protruding axially from the bottom end of the tank and forming a third leg which operates collectively with the other two legs to support the tank upright.

3. In a vacuum collecting apparatus, a rigid frame, draft-inducing means mounted on the frame, said draft-inducing means having intake and discharge sides, spaced brackets on the frame between which a tank may releasably be disposed with its lower end in communication with the discharge side of the draft inducing means, a tank, a hinged closure member at the bottom of the tank through which the content may be emptied when the closure is opened, said closure member having a convex protrusion extending therefrom, a recessed seating plate on the bracket at that end adapted to receive the convex protrusion on the tank to align the lower end of the tank with the discharge side of the pick-up means, a spring pressed latch on the opposite bracket engageable with the opposite end of the tank to hold it between the brackets, and a pair of legs on the bottom of the tank, said legs and said protrusion collectively forming a threepoint support for the tank when the latter is removed from the frame to stand it upright.

4. In a vacuum collecting apparatus, a rigid frame, draft-inducing means mounted on the rigid frame, said draft-inducing means having intake and discharge sides, a tank, spaced brackets on the frame between which said tank is releasably disposed with its lower end in communication with the discharge end of the draft-inducing means, a handle at the upper end of the tank by means of which it may be disengaged from the brackets, a hinged closure member at the bottom of the tank through which the content may be emptied when the closure is open, means normally holding the closure closed, and a rod extending from near the top of the tank into engagement with the closure, said rod having at its upper end a knob closely adjacent the handle which may be depressed when holding the tank suspended by the handle to open the closure.

5. In a vacuum collecting apparatus, a rigid frame, draft inducing means mounted on the rigid frame, said draft-inducing means having intake and discharge sides, a tank, spaced brackets between which said tank is releasably disposed with its lower end in communication with the discharge side of the draft-inducing unit, said tank having a handle by means of which it may be disengaged from the brackets, a hinged closure member at the bottom of the tank through which the content may be emptied when the closure is open, a yieldable latch holding the closure closed, a rod extending through the tank from top to bottom with its lower end resting on the inside of the closure, and a knob at the upper end of the rod adjacent the handle which may be depressed when holding the tank suspended by the handle to open the closure.

6. Apparatus according to claim 2, characterized in that the tank has pervious walls adapted to filter air when the apparatus is used for picking up dust and solids.

7. Apparatus according to claim 2, characterized in that the tank is an impervious receptacle adapted to hold a liquid when the apparatus is used for picking up wash water.

References Cited in the file of this patent

UNITED STATES PATENTS

| | | |
|---|---|---|
| 744,437 | Thurman | Nov. 17, 1903 |
| 971,044 | Hutchinson | Sept. 27, 1910 |
| 1,428,583 | Deutsch | Sept. 12, 1922 |
| 1,826,798 | Lee | Oct. 13, 1931 |
| 2,046,172 | Leathers | June 30, 1936 |
| 2,187,164 | Leathers | Jan. 16, 1940 |
| 2,372,944 | Forsberg | Apr. 3, 1945 |
| 2,626,418 | Kelly et al. | Jan. 27, 1953 |
| 2,886,125 | Denker | May 12, 1959 |

FOREIGN PATENTS

| | | |
|---|---|---|
| 386,999 | Great Britain | Jan. 24, 1933 |